March 10, 1953 L. I. LAUTHER 2,630,996
CHASSIS FASTENING MEANS
Filed Sept. 16, 1950 2 SHEETS—SHEET 1

INVENTOR.
LESLIE I. LAUTHER
BY Marvin Moody
atty.

March 10, 1953   L. I. LAUTHER   2,630,996
CHASSIS FASTENING MEANS
Filed Sept. 16, 1950   2 SHEETS—SHEET 2

INVENTOR.
LESLIE I. LAUTHER
BY
Marvin Moody
atty.

Patented Mar. 10, 1953

2,630,996

UNITED STATES PATENT OFFICE 2,630,996

CHASSIS FASTENING MEANS

Leslie I. Lauther, Cedar Rapids, Iowa, assignor to Collins Radio Company, Cedar Rapids, Iowa, a corporation of Iowa Application September 16, 1950, Serial No. 185,306

4 Claims. (Cl. 248—361)

This invention relates to holding means for connecting three members.

It is often desirable to detachably connect two or more members together. In the radio chassis field, for example, it is sometimes necessary to detachably mount a chassis and its cover case on a shock mount. Oftentimes the shock mounts are mounted side by side and the covers and chassis are inserted into openings formed therefor with only the ends extending. It has been customary to fasten the rear of the chassis cover to the shock mount by means of pins that extend from the rear of the shock mount and are received into openings formed in the chassis cover. This type of fastening does not make a tight connection between the shock mount and the rear end of the cover and also the pin receiving openings cause undue strain on the thin wall of the chassis cover.

It is an object of this invention, therefore, to provide a positive holding means for holding together the rear end of a chassis cover and a shock mount.

A further object of this invention is to provide means for fastening together a base member and a container.

A further object of this invention is to provide means for fastening the rear end of a chassis cover to a shock mount when the rear of the shock mount is out of view.

A feature of this invention is found in the provision for a flexible means which is mounted in the base of a shock mount and has an extending loop at the mid-portion thereof that is engageable with receiving lugs mounted on the rear of a chassis cover. The flexible means may be tightened and attached to the front of the chassis to tightly connect the rear of the chassis cover to the shock mount.

Further objects, features and advantages of this invention will become apparent from the following description and claims when read in view of the drawings, in which:

Figure 1:
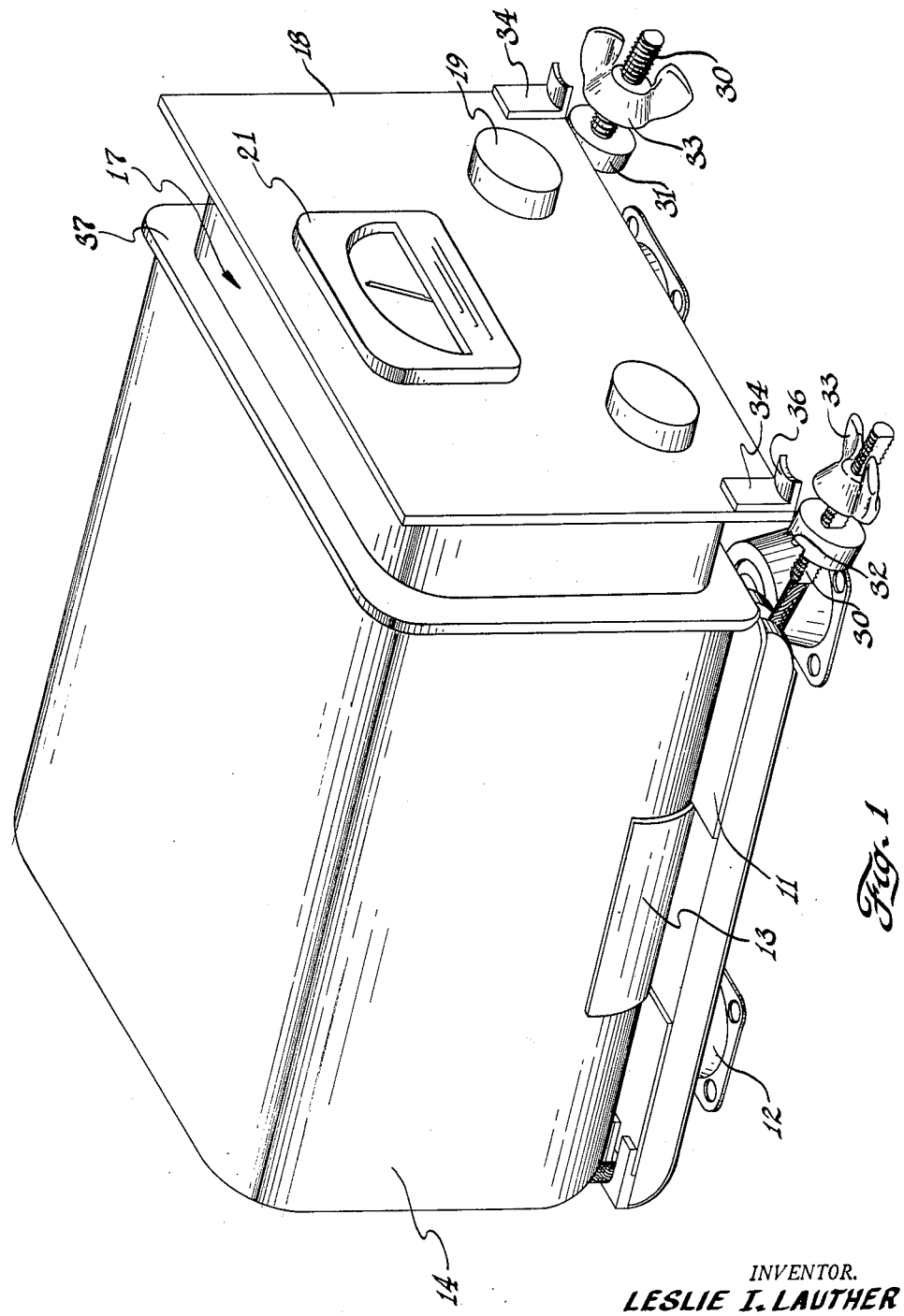
Figure 1 is an isometric view of the holder means of this invention showing the chassis, chassis cover, and shock mount base.

Figure 1 illustrates a shock mount that comprises the base plate 11 and a two-way shock absorber 12 at either corner thereof. The shock absorbers 12 may be fastened to an airplane or any other body subject to vibrations. The base plate 11 has upward extending side portions 13 that are of a generally arcuate shape and are adapted to receive therein a chassis cover 14.

Figure 2:
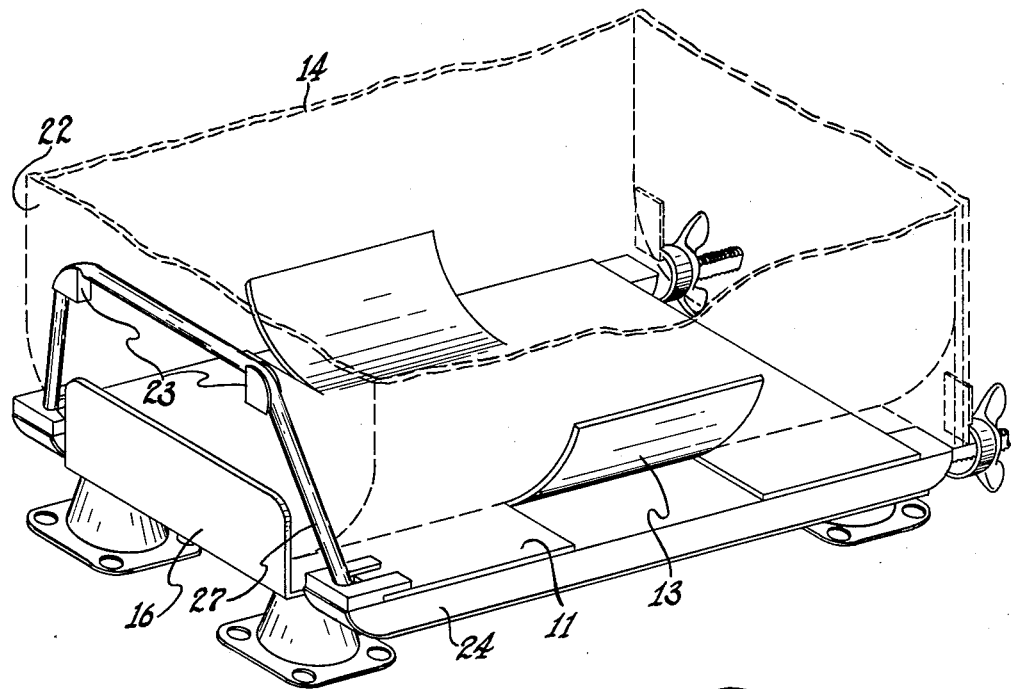
Figure 2 is a rear isometric view of the fastening means of this invention showing how the flexible means engages the holding lugs on the chassis cover; and, Figure 3 is an enlarged detailed view of the base plate showing the position of the flexible means.
Figure 3:
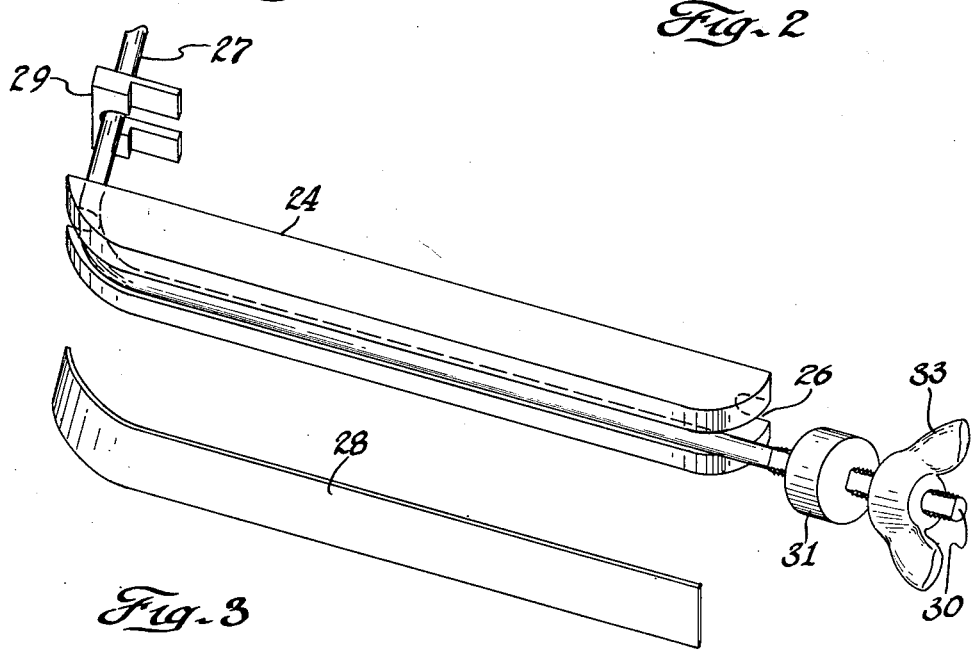

As best shown in Figure 2, a rear plate 16 extends up from the base plate 11 to engage the chassis cover 14. A chassis, designated generally as 17, is received within the chassis cover 14 and has attached thereto a front plate 18. The front plate of the chassis 18 has mounted thereon the necessary controls and adjustment knobs 19 and meter 21. Attached to the rear 22 of the chassis cover 14 are a pair of engaging portions 23 that are arcuately shaped and are formed with recesses about the circumferential portion. Below and at either side of the base plate 11 are attached longitudinal guides 24, best shown in Figure 3. The guides 24 are formed with longitudinal slots 26 and terminate at either end thereof in the upwardly extending arcuate portions. A flexible member 27 which may be a steel cable, for example, passes over the engaging portions 23 and down through the slots 26 formed in the members 24. A bottom cover 28 is attached to each of the members 24 to cover the flexible member 27. A guide means 29 of a generally U shape is attached to the rear end of the member 24 to guide the flexible means 27 generally upward from the member 24.

The ends of the flexible member 27 emerge from the slots 26 and are connected to threaded portions 30. A cylindrical lug 31 is loosely received on the portion 30 and has a recess 32 formed therein. A thumb screw 33 is threadedly received on the portion 29 adjacent the member 31. Attached to the front plate 18 of the chassis 17 are engaging lugs 34 that are connectible with the members 31. The opening 32 receives an extending portion 36 of the lug 34 and the thumb screws 33 may be tightened to draw the front plate 18 tightly against the rim 37 of the cover 14.

Means are thus provided for holding the chassis 17, the chassis cover 14 and the shock mount 11 securely together. As shown in Figure 2, the thumb screws 33 have been tightened to tension the flexible means 27, thus drawing the rear end of the chassis cover 14 tightly against the shock mount 11. The front of the chassis cover 14 is held down by the chassis 17 which is slidably received in the cover.

If it is desired to remove the chassis 17 from the cover 14 the thumb screws 33 are loosened until the members 31 may be disengaged from the portions 36. The threaded portions 30 may then be deflected downwardly and the chassis 17 removed from the cover. If it is desired to remove the cover 14, the threaded portions 30 are pushed by the operator into the slot 26 until the portion of the flexible means that engages the members 23 has been disconnected therewith. Then the cover 14 may be removed from the shock mount. The flexible portion 27 will continue to loop upwardly due to the stiffness of the cable and the guides 29. When the cover 14 is placed once again on the shock mount 11 the lugs 23 will be engaged by the flexible member 27 as it is tightened at the front of the shock mount. The combination of the stiffness of the cable and the shape of the guides 29 makes this possible. The lugs 31 are engaged by the members 36 and the thumb screw 33 tightened. This causes the rear of the cover 14 to be tightly held on the shock mount 11 and the chassis cover and shock mount become a rigid assembly.

Although this invention has been described with respect to a chassis and chassis cover mounted on a shock mount, it is to be understood that it relates to any use wherein two or three members such as the above are to be connected.

Although the invention has been described with respect to a preferred embodiment, it is not to be so limited as changes and modifications may be made therein which are within the full intended scope of the invention as defined by the appended claims.

I claim:

1. Fastening means for connecting a base plate, chassis cover and chassis together comprising, a longitudinal guide extending along each side of said base plate, a flexible member passing through said guides, a center portion of said flexible member forming an upwardly extending loop, engaging portions attached to the rear of said cover to receive the flexible loop therein, threaded portions attached to each end of said flexible member, holding means connected to each threaded portion, and mating lugs mounted on said chassis and engageable with said holding means.

2. Means for detachably connecting a base plate, a chassis, and a chassis cover comprising, a pair of longitudinal guides mounted to the underside of said base plate, a pair of engaging portions mounted to the rear of said chassis cover, a flexible member passing through said pair of longitudinal guides and up over said engaging portions, a pair of lugs attached to said chassis, and the two ends of said flexible member detachably connectible to said lugs.

3. Means for rapidly attaching a base plate, a chassis cover, and a chassis to form a unitary assembly comprising, a pair of longitudinal guides mounted to the bottom of said base plate, a pair of engaging portions mounted to the rear of said chassis cover, a flexible member extending through said guides and over said engaging portions, and holding means for connecting the ends of said flexible member to said chassis.

4. Apparatus for connecting a base plate, a chassis cover, and a chassis comprising, a pair of longitudinal guides mounted to the bottom of said base plate, a pair of engaging portions attached to the rear of said chassis cover, a flexible means passing through one of said guides, up over the pair of engaging portions, and through the other guide, a pair of lugs mounted to the front of said chassis, a pair of cylindrical lugs threadably connected to the ends of said flexible member, and said cylindrical lugs engageable with the lugs on the chassis to form a unitary assembly.

LESLIE I. LAUTHER.

REFERENCES CITED

The following references are of record in the file of this patent:

UNITED STATES PATENTS

| Number | Name | Date |
|---|---|---|
| 1,848,930 | Blakely | Mar. 8, 1932 |
| 2,017,531 | Dodelin | Oct. 15, 1935 |